INVENTORS
WILLEM GRUITROY
DIRK JAN RAABEN 3,443,419
METHOD AND APPARATUS FOR MEASURING THE MATURITY OF VISCOSE
Willem Gruitroy, Arnhem, and Dirk J. Raaben, Dieren, Netherlands, assignors to American Enka Corporation, Enka, N.C., a corporation of Delaware
Filed Oct. 18, 1966, Ser. No. 587,492
Claims priority, application Netherlands, Oct. 27, 1965, 6513877
Int. Cl. G01n 11/00
U.S. Cl. 73—64.1      6 Claims

ABSTRACT OF THE DISCLOSURE

A method of measuring the maturity of viscose that includes (1) metering viscose and coagulant to a mixer, (2) mixing the viscose to form a liquid mixture, (3) measuring the viscosity of the mixture, (4) producing a signal when the viscosity has exceeded a predetermined value, (5) varying the rate at which viscose or coagulant is metered to the mixer in a programmed manner, until the viscose coagulates, and the viscosity exceeds the predetermined value, and (6) using the rate varied at the moment the signal is produced as a measure of the maturity of the viscose; and apparatus for effecting this method.

---

Figure 1:
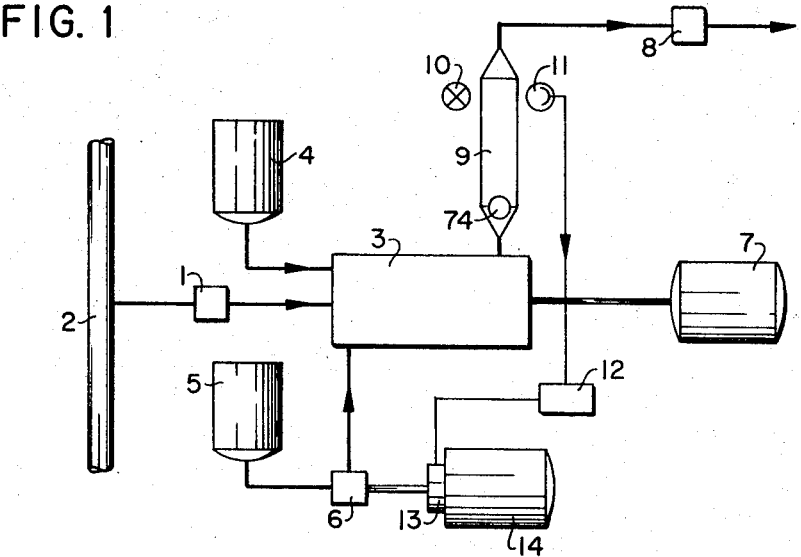

This invention relates to a method and an apparatus for measuring the maturity of viscose by effecting coagulation of the viscose. In particular, this invention relates to a method and an apparatus in which the maturity of viscose is determined by measuring an increase in the viscosity of a liquid mixture containing the viscose upon coagulation of the viscose.

It is known to determine the maturity of viscose by the method proposed by Hottenroth. By this method distilled water is added to a standard amount of the viscose to be tested until a standard dilution has been obtained. An ammonium chloride solution of a standard concentration is then added to the diluted viscose from a burette with stirring. The amount of ammonium chloride required to coagulate the viscose, which is referred to as the ammonium chloride number, indicates the maturity of the viscose tested.

The Hottenroth method, however, has the disadvantage that it is difficult to establish exactly when the viscose coagulates. Therefore, if this maturity measurement is carried out by different persons, the results obtained will show a relatively great spread. It is therefore preferred always to have this measurement carried out by one and the same person. If the maturity measurements must be carried out by several persons, then it is the practice to at least take steps that all persons derive their skill from the same person in order that the pattern of their observations may show some uniformity.

This measuring method not only may lead to observation errors, but also involves much work.

According to the present invention the disadvantages of the above-mentioned method are obviated in that a method is provided which can obtain uniform and highly accurate measurements of the maturity of viscose.

Thus, this invention contemplates a method for measuring the maturity of viscose which comprises metering given amounts of viscose and of a coagulant separately to a mixing means; mixing said viscose and said coagulant in said mixing means to form a flowing liquid mixture, measuring the viscosity of the liquid mixture, producing a signal that indicates whether the viscosity of the mixture has exceeded a predetermined value, varying the rate at which at least one of said amounts is metered into said mixing means in accordance with a predetermined program at least until the viscose in the mixture coagulates and the viscosity of the mixture exceeds said predetermined value, determining the rate of said varying amount at the moment said signal is produced, and using this rate as a measure of the maturity of the viscose.

More particularly, this invention is directed to a method in which per unit time a given amount of viscose and a given amount of a coagulating liquid are metered into a mixer in liquid streams, the mixture obtained is fed to a measuring device or means which produces an output quantity or signal that abruptly changes when the viscosity of the mixture has exceeded a predetermined value, the flow rate of at least one of the liquid streams to the mixer is varied with time in accordance with a predetermined program, the program is carried out at least up to the moment the output quantity of said measuring device abruptly changes, and the flow rate of the varying liquid stream is determined at said moment and serves as a measure of the maturity of the viscose.

It has been found that the relation between the viscosity of the mixture heretofore described and the flow rate of the varying liquid stream is represented by a curve showing a distinct kink at that flow rate of the varying liquid stream at which coagulation takes place. Coagulation is attended with a sharp rise in viscosity. It has been found that for each maturity value there is obtained a specific curve with a kink. The present method thus utilizes the established phenomenon that there is a unique relationship between the flow rate of the varying liquid stream at the moment an abrupt rise in viscosity occurs, and the maturity of the viscose.

Viscose may be used as the varying liquid stream which is added to the mixer. The viscose may be metered into the mixer, for instance, with the aid of a gear pump, and the speed of the pump can be varied in accordance with a predetermined program. If the stream of the coagulating liquid fed to the mixer is constant, then the flow rate of the viscose stream is to be measured at the moment the measuring device registers an abrupt rise in the viscosity of the liquid mixture flowing from the mixer.

In this case the program must begin with the viscose stream having a relatively high flow rate in order to prevent the point of coagulation from being reached immediately. As a result, the amount of viscose used is relatively large.

It is also possible, however, to choose as the varying liquid stream the coagulating liquid and to keep the rate of flow of the viscose stream constant. In that case the measured quantity indicating the maturity of the viscose is the rate of flow of the coagulating liquid at the moment there is an abrupt rise in the viscosity of the liquid flowing from the mixer.

However, since the flow rate of the mixture leaving the mixture in this case is also varied, it would be necessary, in order to obtain a constant mixing action, to also vary the speed of the mixer. Although it is true that this variation in mixing may be omitted by choosing a driving speed for the mixer that is sufficiently high, such high driving speeds would lead to a greater degree of wear and to an increase in the temperature of mixing.

It is therefore preferred in accordance with this invention to use a method characterized in that the viscose is fed to the mixer at a constant rate of flow, the varying liquid stream is formed by a coagulant of constant concentration, the liquid mixture is withdrawn from the mixer at a constant rate of flow which is higher than the sum of the rates of flow of the viscose and the coagulant fed to the mixer, and the difference between the rate of flow of the liquid mixture withdrawn from the mixer and said sum is made up by a stream of diluting liquid fed to the mixer.

The coagulating liquid, in this case, is thus composed of a coagulant of a constant concentration and a diluting liquid such as demineralized water. Since the feed rate of the viscose and the rate of withdrawal of the mixture are constant, the sum of the feed rates of the coagulant and the diluting liquid is constant too. In the mixer, the stream of viscose is therefore subject to a constant dilution by the coagulating liquid. The concentration of the coagulant is thus directly proportional to the flow rate of the stream of the coagulant.

As a coagulant use may be made of an ammonium chloride solution. It will be appreciated, however, that other salt coagulants may be employed. For example, it has been found that a very favorable method is obtained when a sodium bicarbonate solution is used as a coagulant.

With the aid of the sodium bicarbonate coagulant, the sensitivity with which the point of coagulation can be determined is found to be four times higher than when use is made of ammonium chloride as a coagulant.

In accordance with this invention, it is further preferred that the composition of the liquid flowing from the mixer between two successive maturity determination is changed to that of a non-coagulating liquid of relatively low viscosity and that this composition flows through the measuring device for some preselected time.

The low-viscous liquid obtained in this way serves as a flushing liquid which prevents clogging of the apparatus in which the method is carried out.

This invention also contemplates an apparatus for measuring the maturity of viscose which comprises means for metering a liquid stream of viscose and a liquid stream of a coagulant solution to a mixer, means for withdrawing a liquid mixture containing viscose and the coagulant solution from said mixer, a programming means for controlling the rate of flow of one of said liquid streams, the rate of flow of the said one stream being varied with time in accordance with a predetermined program at least until the viscosity of the liquid mixture increases abruptly due to coagulation of the viscose, a measuring means operably associated with the means for withdrawing said liquid mixture from said mixer, said measuring means emitting a signal when the viscosity of said mixture abruptly increases, and means actuated by said signal for determining the flow rate of said one liquid stream when said abrupt increase occurs to provide a measure of the maturity of said viscose.

More particularly, this invention is also directed to an apparatus for determining the maturity of viscose with the aid of a coagulant in which there are provided means for transporting the viscose and the coagulant separately in liquid streams, a mixer to which the viscose and the coagulant are fed and in which both are mixed, discharge means connected to said mixer for withdrawing a liquid mixture therefrom, a programming unit for controlling the transporting means to vary the rate of flow of at least one of the liquid streams to the mixer, the flow rate of the stream being varied with time in accordance with a predetermined program, a measuring means comprising a tube communicating with said discharge means and through which the mixture may flow, a member provided in the tube and having a specific gravity that is higher than that of the mixture, and a pickup means, e.g., a photocell, which emits a signal when the member is carried along by the mixture upon an abrupt increase in the viscosity of the mixture, and means responsive to said signal for recording the rate of flow of said varying liquid stream at the moment said abrupt increase occurs.

Advantageously, it is also preferred that the apparatus of this invention is provided with a first pump which feeds the viscose to the mixer at a constant rate of flow, a second pump which, under the control of the programming unit, feeds the coagulant to the mixer at a flow rate varying with time in accordance with a predetermined program, a reservoir connected to the mixer containing a diluting liquid, and a third pump connected to a discharge conduit of the mixer and downstream of the measuring means, said third pump withdrawing the liquid mixture from the mixer and feeding it to the measuring means at a constant rate of flow which is higher than the sum of the rates of flow of the viscose and the coagulant. It will be appreciated that the third pump may, if desired, be placed between the mixer and the measuring means.

A very simple and reliable measuring means is characterized in that it has a tube with a circular-cylindrical inner surface, the member provided in the tube is formed by a ball, and the ratio of the diameter of the ball to that of the inner surface of the tube is about 0.75.

Thus, it has been found that a ball in the liquid mixture will rotate at a high speed during the flushing stage when a mixture of low viscosity flows into the tube. As a result, and particularly if the above-mentioned ratio is 0.75, the ball is rapidly freed from the thick liquid adhered thereto during the preceding coagulation. In this way, the ball is prevented from sticking to its seat and from being unable to rise in the tube during the next measuring cycle.

The apparatus of this invention may be provided with a rotary pump for delivering the varying liquid stream. The speed of the rotary pump may be continuously set to a value that corresponds to a control voltage by electric means. It is possible to vary the flow rate of this liquid stream with time in accordance with the predetermined program by causing the control voltage to increase linearly with time. However, when it is desired also to apply measuring cycles of relatively long duration, then effecting such a program with the aid of a sawtooth oscillator presents practical difficulties. Difficulties are also encountered when use is made of a potentiometer having a rotary sliding contact, when the control voltage, after coagulation has set in, must be reset to its initial value very rapidly.

A simple and reliable apparatus, the use of which is to be preferred, is obtained when a programming unit is used for varying said liquid stream with time in accordance with a predetermined program. Specially, it has been found advantageous to use a programming unit which gives off a control voltage that can vary in $2^n$ steps and which has a voltage divider that is connected to a constant voltage. This voltage divider comprises $n$ fixed resistors which are connected in series, and $n$ on-off switches which are connected in series and are each connected in parallel to one of the fixed resistors, the fixed resistors being connected in series in $2^n$ different combinations by the use of the on-off switches. These $2^n$ possible resistor combinations may be realized by manually operating the switches in accordance with a predetermined program.

However, a simple and fully automatic operation is obtained by providing the apparatus of this invention with a pulse generator which emits a periodical pulse train, the period of which is equal to the duration of a step, and a gate circuit which, from the beginning of a measuring cycle allows the passage of the pulses of the pulse train until the viscosity (of the liquid mixture heretofore described) abruptly rises and the pick-up means emits a signal, and further by forming the on-off switches from relays having contacts connected in parallel to the fixed resistors and having coils energized by the outputs of bistable elements which are combined into a binary counter, the pulses passing through said gate circuit being fed to the input of said binary counter.

Figure 2:
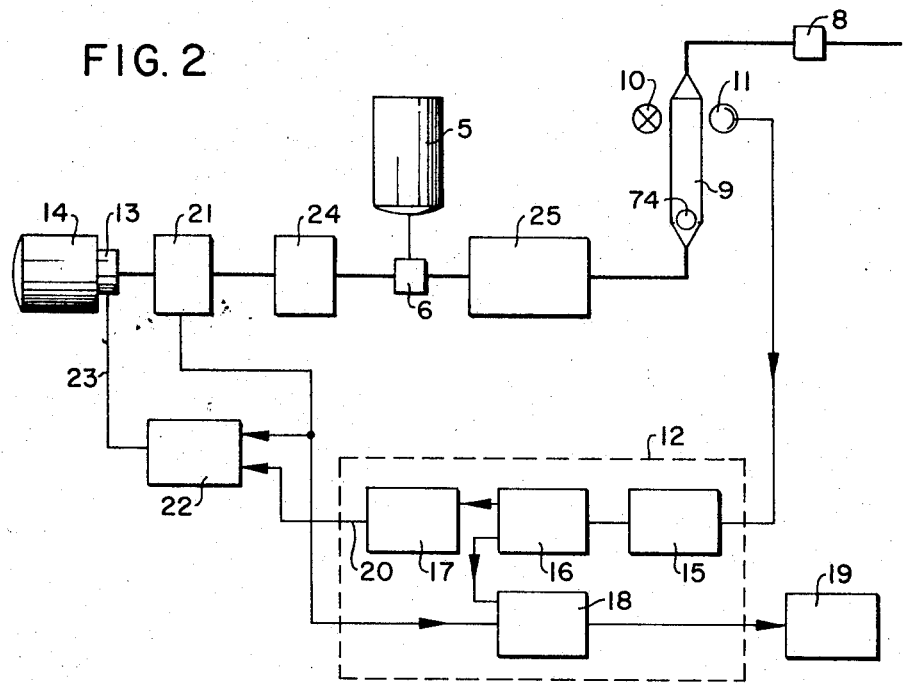
Figure 3:
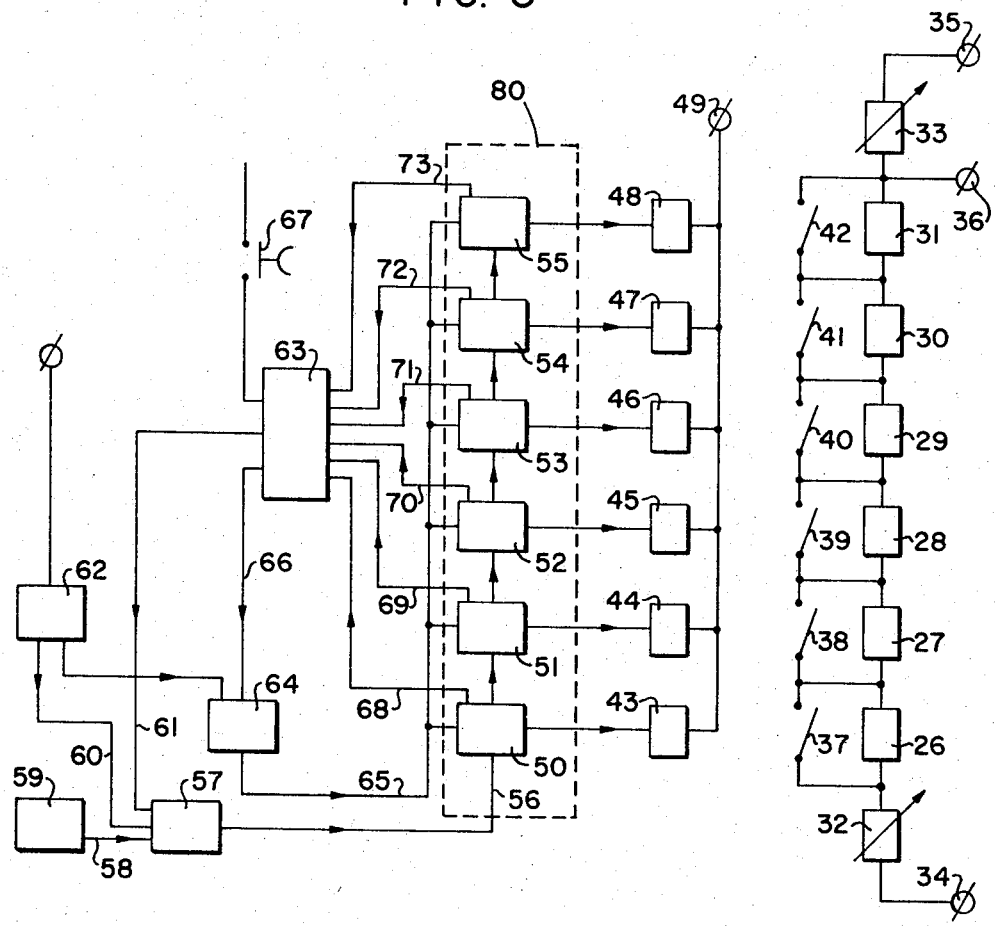

The invention will be further described with reference to the accompanying drawings in which:

FIGURE 1 schematically shows a flow diagram of a preferred embodiment of the apparatus of this invention;

FIGURE 2 shows a block diagram of the electric control circuit used to automatically control the apparatus of FIGURE 1 in accordance with the method of this invention; and FIGURE 3 shows a block diagram of the circuit of the programmer used in the control circuit of FIGURE 2.

In FIGURE 1 the reference numeral 1 designates a viscose pump which pumps viscose at a constant rate from a viscose conduit 2 (only partly shown) to a mixer 3. Also fed to the mixer 3 are demineralized water from a vessel 4 and a salt solution from a vessel 5. The salt solution serves as coagulant, and in the instant case, consists of a sodium bicarbonate solution of a predetermined or selected concentration, for example 7%, which is suitable for the range within which the maturity is to be measured. A salt pump formed by a gear pump 6 pumps the salt solution to the mixer 3. The mixer 3 is provided with a stirrer (not shown) which is driven at a constant speed by an electric motor 7. The mixture of viscose, water and salt solution formed in the mixer is drawn off at a constant rate by pump 8. Between the mixer 3 and the pump 8 there is provided a measuring means which includes a transparent tube 9 having one portion with a circular-cylindrical inner surface; that is, the tube has a portion with a circular cross-section having a constant inside diameter.

Enclosed in the tube is a steel ball or sphere 74, having a diameter which is smaller than the inside diameter of the cylindrical portion of the tube. Normally, the ball rests on a conical seat at the bottom end of the tube. On the outside of tube 9 there is positioned a light source 10 which casts a light beam through the tube onto a photocell 11 placed on the opposite side of tube 9.

The photocell 11 is connected to a programming unit 12, which insures that the speed of the salt pump 6 is varied in steps of equal magnitude and duration. The pump 6 is driven by an electric motor 14 via an eddy current coupling 13.

The above-described apparatus operates as follows:

The programming unit 12 varies the input which energizes the eddy current coupling so that the speed of the salt pump 6 is increased stepwise from a predetermined initial value. As a result, the salt pump 6 supplies a liquid stream to the mixer 3 at a flow rate which is also varied stepwise. The rate at which the pump 8 withdraws liquid from the mixer 3 is higher than the sum of the rates at which the viscose and the coagulant (i.e., the salt solution) are fed to the mixer. The difference between the rate of withdrawal and the sum of the feed rates is made up by the rate of demineralized water supplied from the vessel 4. Since the viscose is supplied at a constant feed rate, the coagulating liquid (which consists of the coagulant, i.e., the sodium bicarbonate solution, and the demineralized water) is supplied at a constant feed rate too. The dilution of the viscose in the mixer 3 with the coagulating liquid is therefore independent of the feed rate of the coagulant supplied from the vessel 5. As a result, the concentration of the coagulant in the mixture flowing from the mixer 3 is directly proportional to the delivery of the pump 6.

When the delivery of the pump 6 has become such that coagulation of the viscose sets in, the viscosity of the mixture rises abruptly. The ball 74 is then carried along in an upward direction by the highly viscous mixture and interrupts the light beam impinging on the photocell 11. A stop is provided at the upper end of tube 9 to prevent the ball from rising any further.

The signal emitted by the photocell forms the output quantity of the measuring means and it indicates when viscosity of the mixture exceeds a pre-determined value. This threshold value is so chosen that, within the measuring range of a given viscose maturity, the ball does not interrupt the light beam before there is an abrupt rise in the viscosity of the mixture.

When the light beam impinging on the photocell 11 is interrupted, the photocell emits a signal to the programming unit 12. As a result the speed of the pump 6 is maintained for a predetermined measuring time at the value to which it was last set. During this measuring time the speed of the salt pump at which coagulation has set in may be registered in analogue or digital form and/or be processed in any other suitable way.

At the end of the measuring time the speed of the salt pump is reset to its initial value. As a result, the coagulation of the mixture flowing to the tube 9 is stopped and the viscosity of the mixture becomes relatively low again. Consequently, the ball 74 begins to sink. There now begins a second or subsequent measuring cycle, in which the programming unit 12 increases the speed of the pump 6 in a stepwise manner. However, when this measuring cycle begins, it has a time interval during which the speed of the pump 6 is maintained at the initial value. The low viscosity mixture flowing through the tube 9 during this time interval serves as flushing liquid which carries off the coagulated mixture and causes the ball 74 to sink to its seat at the lower end of the tube 9. After this flushing stage the first change of the speed of the pump 6 follows in the new measuring cycle.

FIGURE 2 schematically shows the electric control circuit of the invention in greater detail. In FIGURE 2 the parts of the apparatus that are also shown in FIGURE 1 are referred to by the same reference numerals. The programming unit 12 is made up of the parts indicated within the dash lines and comprises an amplifier 15 for amplifying the signal produced by the photocell 11, a measuring time circuit 16, a programmer 17, and a measuring circuit 18.

The input signals to the amplifier 15 may be schematically indicated by a pulse, the leading edge of which appears when ball 74 interrupts the light beam directed onto photocell 11. When the ball falls and thus allows free passage of the light beam, the trailing edge of the input signal appears.

A recording pick-up 19 is connected to the output of the measuring circuit 18. The pick-up is a chart recorder, but other appropriate recorders such as one which records by registration on a punch tape may also be employed. At its output 20 the programmer 17 gives off a control voltage that varies stepwise with time, and which represents the desired speed of the pump 6.

The measuring time circuit 16 is designed to give a fixed time delay of, for example 1.6 seconds, during which time the speed of pump 6 may be recorded by the recording pick-up 19. This circuit comprises an electronic timer circuit which gives an output pulse the width of which is equal to the required time delay, in this case, 1.6 seconds. The leading edge of this pulse coincides with that of the output pulse from amplifier 15.

Coupled to the output shaft of the eddy current coupling 13 is a tachometer generator 21. The voltage generated by the tachometer generator is fed both to a servo amplifier 22 and to the measuring circuit 18. In the servo amplifier 22, the voltage of the tachometer generator 21 is compared with the control voltage of the programmer 17. If the voltage of the tachometer generator deviates from the control voltage, then an error signal is produced and amplified by the servo amplifier. This signal, passed through line 23, controls the energizing of the eddy current coupling. Control of the eddy current coupling is effected by changing the current through the exciting coil of the coupling in such a way that the deviation between the voltages of the generator and the control voltage is reduced.

Programmer 17 is more fully described with reference to FIGURE 3.

The measuring circuit 18 converts the pulse signal from tachometer generator 21 into a signal which can be used as an input signal for recorder 19. Furthermore, it insures that recording only takes place during the time delay (1.6 seconds) imposed by the timing circuit 16. The measuring circuit may, for example, comprise an AND-gate, a Schmitt trigger, a binary counter and a digital-to-analogue converter. The AND-gate is arranged to receive inputs from the generator 21 and the timing circuit 16 and to direct its output to the Schmitt trigger. When passing the AND-gate, the pulses from generator 21 are shaped by the Schmitt trigger and then fed to the binary counter. When the recorder 19 is, as in the present case, a recorder for giving an analogue registration, the digital-to-analogue converter is interconnected between the binary counter and the recorder.

The eddy current coupling 13 drives the salt pump 6 by a gear transmission system 24. For the sake of simplicity, the water pump 1, the water vessel 4, and the mixer 3 with its driving motor 7 (which are separately shown in FIGURE 1) are all indicated in the circuit by the block 25.

FIGURE 3 is a more detailed illustration of the circuit of the programmer 17. As shown, the programmer comprises six fixed resistors 26 to 31, which are connected in series and form part of a voltage divider. The divider also has two adjustable resistors 32 and 33. A constant D.C. voltage is applied to the input terminals 34 and 35 of the voltage divider. The terminals 34 and 36 are connected to the servo amplifier 22 for feeding the control voltage thereto. The resistance of the resistors 26 to 31 increases according to a geometric progression having a common ratio of 2. Thus, when the resistance of the resistors 26 is represented by R, the resistance of the resistors 27 to 31 are 2R, 4R, 8R, 16R, and 32R, respectively.

Make contacts 37 to 42 are connected in parallel to the resistors 26 to 31, respectively. These contacts form part of relays having coils referred to by reference numerals 43 to 48. One terminal of each relay coil is connected to the negative terminal 49 of a D.C. source (not shown). The other terminal of each relay coil is connected to the output of a bi-stable element. These bi-stable elements are formed by flip-flops 50 to 55, which are combined into a binary counter 80. The input 56 of this counter is connected to the output of a gate circuit 57. The input 58 of the circuit 57 is connected to a pulse generator 59. The pulse generator 59 produces a periodic pulse train, the period of which is equal to the duration of a step of the pump 6. The inputs 60 and 61 of the gate circuit 57 are coupled with a start-stop circuit 62 and a safety circuit 63.

The gate circuit 57 is opened for the passage of pulses from pulse generator 59 under control of start-stop circuit 62 and safety device 63. The gate-circuit 57 can comprise an AND-gate so that when the outputs of both circuit 62 and device 63 represent logic "1," the pulses from pulse generator 59 will pass to the binary counter 80.

The start-stop circuit is controlled by the measuring time circuit 16 (see FIGURE 2) and is also connected to a reset device 64, which resets the binary counter by way of a line 65.

Thus as shown, the start-stop circuit 62 has its input connected to the output of the time circuit 16. Circuit 62 is interconnected to deliver two output pulses of different polarity to gate circuit 57 and reset device 64, respectively. The output pulse on line 60 originates from a timer included in the start-stop circuit 62. This timer supplies a pulse to line 60, upon which gate circuit 57 is blocked. The other output pulse of start-stop circuit 62 is supplied to reset device 64. At the trailing edge of this other output pulse, which edge coincides with the trailing edge of the input pulse to circuit 62, reset device 64 applies a pulse to counter 80, whereby it is reset to zero. The leading edge of the pulse on line 60 coincides with the leading edge of the input pulse to the start-stop circuit, but the width of the former is greater than the width (1.6 seconds) of the latter. As a matter of face, the width of the blocking pulse on line 60 is so great as to allow for a flushing phase or stage after the speed of pump 6 has been reduced due to the resetting of counter 80.

When necessary, the binary counter may also be reset by the safety device 63 via line 66. The safety device 63 comprises an AND-gate and a flip-flop. When the speed of pump 6 becomes too high, indicated by the count of counter 80 reaching its maximum value, all flip-flops 50 to 55 give a logic "1" signal at their outputs 68 to 73. Consequently, the AND-gate in device 63 applies an output signal to the flip-flop connected thereto. This flip-flop blocks gate 57 through line 61 and provides a reset of counter 80 by way of line 66 and reset device 64, thereby decreasing the speed of pump 6.

Each of the inputs 68 to 73 of the safety device 63 is connected to an output of the flip-flop circuits 50 to 55. A pushbutton switch 67 serves to reset the safety device 63.

Reset device 64 includes an OR-gate so that both start-stop circuit 62 and safety device 63 may reset counter 80.

The programming unit shown in the FIGURES 2 and 3 operates as follows: When the gate circuit 57 is opened by the start-stop circuit 62 (which is controlled by the measuring time circuit), the square pulses produced by the pulse generator 59 are allowed to pass to the binary counter 80 formed by flip-flops 50 to 55. This counter, which is reset to zero at the end of the preceding measuring cycle, energizes the relay coils 43 to 48 so that the make contacts 37 to 42 are switched on or off to represent successive binary configurations. Six make contacts may consequently form $2^6=64$ different switching configurations, each of which is initiated by a pulse produced by the pulse generator 59. The resistance in the voltage divider now increases from 0 to 63R according to an arithmetic progression having a common difference R. The adjustable resistors 32 and 33 serve to compensate for the non-linear relationship between the control voltage and the output speed of the eddy current coupling 13, so that the speed of the pump 6 increases in equal steps. Upon coagulation of the viscose, the ball 74 interrupts the light beam impinging upon the photocell 11. Consequently, the photocell emits a signal to the measuring time circuit 16.

Via the start-stop circuit 62 of the programmer 17, the measuring time circuit 16 then blocks the gate circuit 57 so that no more pulses pass to the binary counter 80. As a result, the control voltage from the terminals 34 and 36 and hence the speed of the pump 6, is kept constant for some time. As has been previously mentioned in the description of FIGURE 1, during this time, which is the measuring time, the speed of the pump 6 is registered with the aid of the recording pick-up 19. This recording is effected by the voltage of the tachometer generator 21 being converted into pulses. The number of pulses occurring during the measuring time serves as a measure of the voltage of the tachometer generator.

At the end of the measuring time indicated by the measuring time circuit 16, this circuit resets the binary counter 80 to zero by way of the start-stop circuit 62 and the reset device 64, so that all the resistors 26 to 31 are short-circuited. The speed of the pump 6 is then about half its maximum speed, that is the speed which would occur if all the resistors 26 to 31 were active. This initial speed is maintained for some time, during which the flushing phase takes place. After the speed of the pump 6 has been reduced, the ball 74 sinks in the tube 9 and frees itself from the adhering thick liquid. It has been found that the ball frees itself from adhering coagulated material very rapidly if the ratio of the diameter of the ball 74 to that of the inner surface of the tube 9 is about 0.75.

It will be appreciated that instead of abruptly lowering the speed of the rotary pump 6 after coagulation has set in, it is advantageous to gradually lower its speed. This may also be done stepwise in which case the counter 80 may be replaced by a forward-backward-counter.

A gradual decrease of this rotary speed has the advantage that clogging of the measuring apparatus is even more effectively prevented.

Furthermore, an electromagnetic pick-up may be used instead of a photoelectric pick-up and is particularly advantageous in that its operation is independent of the transparency of the liquid in tube 9. Such an electromagnetic pick-up may comprise a coil surrounding the tube and situated about ten millimeters above the ball seat. This coil forms part of an oscillator circuit so that the amplitude of its output voltage will be changed as soon as the ball 74 passes through the coil. This change is amplitude may be used to indicate coagulation in the manner heretofore described.

The invention may be further understood by reference to the following example:

EXAMPLE

In this example, the maturity of a rayon viscose containing 7.3% cellulose, 5.5% sodium hydroxide and 2.2% sulfur is measured by the method of this invention. A 6% sodium bicarbonate solution is used as the coagulant in an apparatus such as illustrated in the accompanying drawings. The delivery rate of the viscose pump is 10 cubic centimeters per minute: the delivery rate of the salt solution pump varies from 12 to 28 cubic centimeters per minute, inclusive; and the delivery rate of the withdrawal pump connected to the mixer is 40 cubic centimeters per minute, so that the dilution ratio is 1:3. The diameter of the ball used in the transparent tube is 13.5 millimeters and the inside diameter of the tube is 18 millimeters. In the apparatus employed the speed of the salt pump is increased in 64 steps of 12 seconds each.

If the viscose maturity obtained is expressed as an ammonium chloride number, then the measuring range is approximately from 8 to 12, inclusive. The delivery rate of the salt pump then varies between 16.5 and 28 cubic centimeters per minute. The inaccuracy of the values measured with this apparatus is ±0.2. This value corresponds to an inaccuracy of 2% relative to the mean value of the measuring range. When compared with the inaccuracy of the manual Hottenroth method, this result may be considered very satisfactory. With the Hottenroth method there is a rather great spread in the measuring results, which causes inaccuracies which are multiples of those encountered by the apparatus of this invention.

It will be appreciated that when an accurate control device is available for adjusting the speed of the salt pump and when there is a linear relationship between the control voltage and the speed of the pump, a reasonably constant level of the control voltage and a negligible overshoot of the speed after each increase in the control voltage, then the pump speed can be measured merely by registering the corresponding control voltage. The length of the steps of the control voltage may then be adapted to the desired measuring accuracy.

It will be appreciated that, as heretofore described, the maturity of viscose can be determined in accordance with this invention by varying the amount of at least one of the various materials that are metered to the mixer, e.g., the viscose, the coagulant and/or the coagulating liquid, while holding the others constant to cause coagulation and an abrupt increase in the viscosity of the mixture produced in the mixer. Also, it will be apprecated that the maturity may also be obtained by varying the diluting liquid stream to the mixer and by holding the viscose delivery, the coagulant delivery and the withdrawal rate of the liquid mixture constant.

Also, the concentration of the various streams fed to the mixer may be varied in a preselected manner while the flow rates are held constant to effect metering of given amounts of viscose and coagulant to the mixer. Accordingly, it will be understood that these and other similar adaptations of the preferred method are contemplated by this invention and are encompassed by the term "metering."

It will also be appreciated that in many instances, valves can be used in place of pumps to provide the metering means used to control the flow of the various liquid streams, e.g., the coagulant solution or the viscose, to the mixer.

While the novel features of the invention have been shown and described it is to be understood that various omissions, modificatons and substitutions in the features shown and described may be made by those skilled in the art without departing from the spirit and scope of the invention.

What is claimed is:

1. A method for measuring the maturity of viscose which comprises metering given amounts of viscose and of a coagulant separately to a mixing means, mixing said viscose and said coagulant in said mixing means to form a flowing liquid mixture, measuring the viscosity of the liquid mixture, producing a signal that indicates whether the viscosity of the mixture has exceeded a predetermined value, varying the rate at which at least one of said amounts is metered into said mixing means in accordance with a pre-determined program at least until viscose in the mixture coagulates and the viscosity of the mixture exceeds said pre-determined value, determining the rate of said varying amount at the moment said signal is produced, and using said determined rate as a measure of the maturity of said viscose.

2. A method for measuring the maturity of viscose which comprises metering a given amount of viscose and a given amount of a coagulating liquid into a mixer in liquid streams, passing the liquid mixture obtained in said mixer to a measuring means, said means producing an output quantity that abruptly changes when the viscosity of the mixture has execeded a pre-determined value, varying the flow rate of at least one of the liquid streams to the mixer with time in accordance with a pre-determined program, said program being carried out at least up to the moment the output quantity of said measuring means abruptly changes upon coagulation of said viscose, determining the instant flow rate of said varying liquid stream at said moment and using said instant flow rate as a measure of the maturity of said viscose.

3. The method of claim 2 in which said viscose is fed to the mixer in a liquid stream having a constant rate of flow, the varying liquid stream is formed by a coagulant having a constant concentration, the liquid mixture is withdrawn from the mixer at a constant rate of flow which is higher than the sum of the rates of flow of the viscose and the coagulant fed to the mixer, and the difference between the rate of flow of the liquid mixture withdrawn from the mixer and said sum is made up by the rate of flow of a stream of diluting liquid fed to the mixer.

4. The method of claim 3 in which the composition of the liquid mixture flowing from the mixer is controlled to form a non-coagulating liquid of relatively low viscosity between two successive maturity determinations, said low viscosity liquid flowing through the measuring means for a given period whereby clogging of said means by coagulated viscose is prevented.

5. An apparatus for measuring the maturity of viscose which comprises means for transporting viscose and a coagulant separately in liquid streams, a mixer to which the viscose and the coagulant are transported and in which both are mixed, discharge means connected to said mixer for withdrawing a liquid mixture therefrom, a programming means for controlling the transporting means to vary the flow rate of at least one of said liquid streams to said mixer, the flow rate of said one stream being varied with time in accordance with a predetermined program, at least until the viscosity of the mixture increases abruptly, said transporting means including a rotary pump for delivering the varying liquid stream to said mixer and electrical means for controlling the speed of said rotary pump whereby the speed can be continuously set to a value that corresponds to a control voltage, and said programming means having a programming unit which gives off a control voltage that can vary in $2^n$ steps, said unit having a voltage divider comprising $n$ fixed resistors which are connected in series, and $n$ on-off switches which are connected in series and are each connected in parallel to one of the fixed resistors, the fixed resistors being connected in series in $2^n$ different combinations by said on-off switches whereby said programming means can control the speed of the rotary pump to vary the flow rate of the varying liquid stream in a step-wise manner in accordance with said predetermined program, a measuring means comprising a tube in communication with said discharge means through which the resulting mixture may flow, a member in the tube having a specific gravity that is higher than that of the mixture, and a pick-up means which emits a signal when said member is carried along by the mixture upon an abrupt increase in viscosity of said mixture, and means responsive to said signal for recording the rate of flow of the varying liquid stream at the moment said abrupt increase occurs whereby a measure of the maturity of said viscose is obtained.

6. The apparatus of claim 5 in which said programming means includes a pulse generator which emits a periodical pulse train, the period of which is equal to the duration of a step of the pump speed, and a gate circuit which, from the beginning of a measuring cycle, allows the passage of the pulses of the pulse train until the viscosity of the liquid mixture increases abruptly and the pick-up means emits a signal, said on-off switches being formed by relays having contacts connected in parallel to the fixed resistors and having coils energized by the outputs of bistable elements which are combined into a binary counter, the pulses which pass through the gate circuit being fed to the input of said binary counter whereby said programming means provides fully automatic operation for said apparatus.

References Cited

UNITED STATES PATENTS

| 2,630,819 | 3/1953 | Norcross | 137—92 |
| 2,651,936 | 9/1953 | Marnon et al. | 73—53 |
| 3,026,710 | 3/1962 | Lupfer | 73—17 |

FOREIGN PATENTS

| 158,143 | 6/1962 | U.S.S.R. |

LOUIS R. PRINCE, *Primary Examiner.*

JOSEPH W. ROSKOS, *Assistant Examiner.*

U.S. Cl. X.R.

73—57